US012634689B2

(12) United States Patent
Newberg et al.

(10) Patent No.: US 12,634,689 B2
(45) Date of Patent: May 19, 2026

(54) ANONYMOUS NETWORK ACCESS IN A NETWORK ENVIRONMENT

(71) Applicant: Charter Communications Operating, LLC, St. Louis, MO (US)

(72) Inventors: Shane B. Newberg, Aurora, CO (US); Christopher J. Teague, Castle Pines, CO (US); Peter A. Ericksen, Castle Rock, CO (US); Donald W. Sherker, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 366 days.

(21) Appl. No.: 18/209,091

(22) Filed: Jun. 13, 2023

(65) Prior Publication Data

US 2023/0328518 A1     Oct. 12, 2023

Related U.S. Application Data

(62) Division of application No. 17/241,587, filed on Apr. 27, 2021, now Pat. No. 11,722,893.

(51) Int. Cl.
*H04W 12/06* (2021.01)
*H04L 9/40* (2022.01)
(Continued)

(52) U.S. Cl.
CPC ......... *H04W 12/06* (2013.01); *H04L 63/0407* (2013.01); *H04L 63/083* (2013.01);
(Continued)

(58) Field of Classification Search
CPC ... H04L 63/0407; H04L 63/083; H04L 63/10; H04L 63/20; H04W 12/02; H04W 12/06; H04W 76/10
See application file for complete search history.

(56) References Cited

U.S. PATENT DOCUMENTS

| | | | |
|---|---|---|---|
| 11,122,525 B1 | 9/2021 | Khalid | |
| 2014/0220929 A1* | 8/2014 | Ekberg | H04W 48/08 |
| | | | 455/406 |

(Continued)

OTHER PUBLICATIONS

Haque et al., "Anonymous Device Authorization for Cellular Networks", North Carolina State University, Retrieved From https://eprint.iacr.org/2021/753.pdf, Published 2021 (Year: 2021).*

(Continued)

*Primary Examiner* — Chau Le

(74) *Attorney, Agent, or Firm* — Armis IP Law, LLC

(57) ABSTRACT

A same wireless access profile is installed on each of multiple mobile communication devices. The wireless access profile includes outer identity information and anonymous inner identity information for each service. The anonymous inner identity information includes a credential used by each of the multiple mobile communication devices to use the service. To use the service such as access a remote network, a respective mobile communication device communicates an anonymous username and password assigned to the service to a policy server during first level authentication. The policy server stores a network address of the authenticated mobile communication device. During second level authentication, the policy server receives an identity of the mobile communication device from a network gateway. The policy server provides access control information (assigned to the service) to the network gateway. The network gateway then provides access to the mobile communication device in accordance with the access control information.

26 Claims, 11 Drawing Sheets

(51) Int. Cl.
  *H04W 12/02* (2009.01)
  *H04W 76/10* (2018.01)
(52) U.S. Cl.
  CPC .............. *H04L 63/10* (2013.01); *H04L 63/20* (2013.01); *H04W 12/02* (2013.01); *H04W 76/10* (2018.02)

(56) References Cited

U.S. PATENT DOCUMENTS

| | | | |
|---|---|---|---|
| 2015/0326561 A1 | 11/2015 | Shah et al. | |
| 2017/0134941 A1 | 5/2017 | Naslund et al. | |
| 2019/0116493 A1* | 4/2019 | Cyril ..................... | H04W 12/06 |
| 2019/0141624 A1* | 5/2019 | Wong ................... | H04W 48/18 |
| 2019/0268335 A1 | 8/2019 | Targali | |
| 2019/0306164 A1 | 10/2019 | Brands et al. | |
| 2019/0319858 A1 | 10/2019 | Das et al. | |
| 2020/0045541 A1* | 2/2020 | Kreishan ............... | H04W 12/06 |
| 2021/0029629 A1 | 1/2021 | Wong et al. | |
| 2021/0158431 A1* | 5/2021 | Seitz ................. | G06Q 30/0643 |
| 2022/0322083 A1 | 10/2022 | Kreishan et al. | |

OTHER PUBLICATIONS

Cisco, "Cisco AnyConnect Secure Mobility Client Administrator Guide, Release 4.0", Retrieved From https://www.cisco.com/c/en/us/td/docs/security/vpn_client/anyconnect/anyconnect40/administration/guide/b_AnyConnect_Administrator_Guide_4-0.pdf, Published Sep. 22, 2016. (Year: 2016), pp. 1-240.

* cited by examiner

FIG. 6

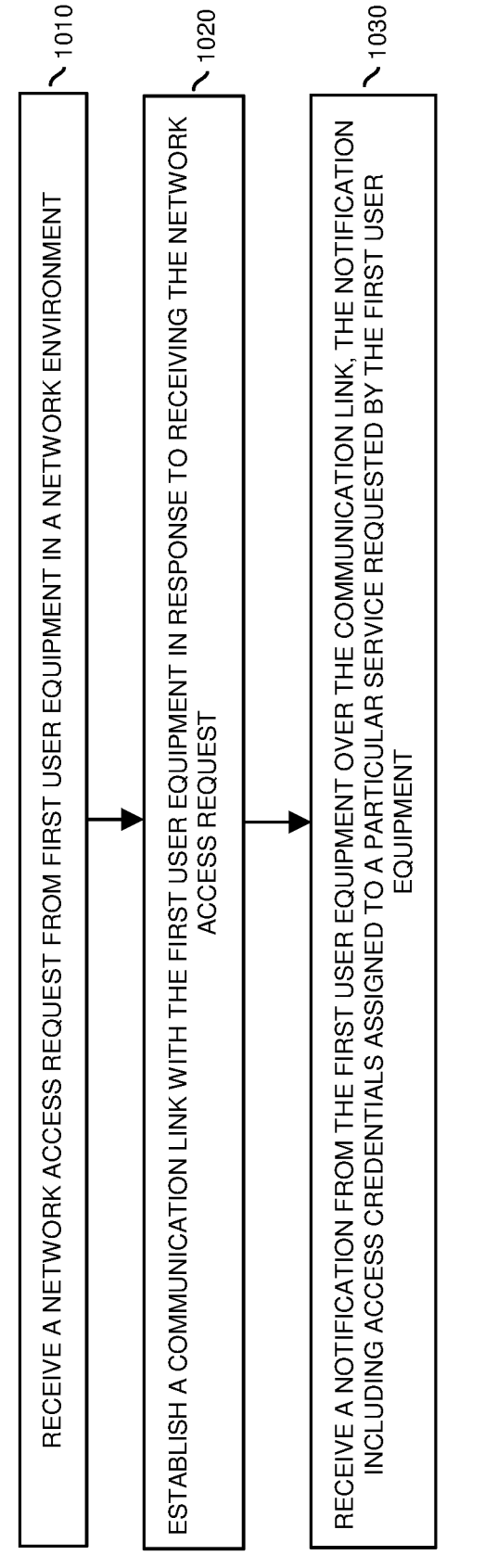

1010 RECEIVE A NETWORK ACCESS REQUEST FROM FIRST USER EQUIPMENT IN A NETWORK ENVIRONMENT

1020 ESTABLISH A COMMUNICATION LINK WITH THE FIRST USER EQUIPMENT IN RESPONSE TO RECEIVING THE NETWORK ACCESS REQUEST

1030 RECEIVE A NOTIFICATION FROM THE FIRST USER EQUIPMENT OVER THE COMMUNICATION LINK, THE NOTIFICATION INCLUDING ACCESS CREDENTIALS ASSIGNED TO A PARTICULAR SERVICE REQUESTED BY THE FIRST USER EQUIPMENT

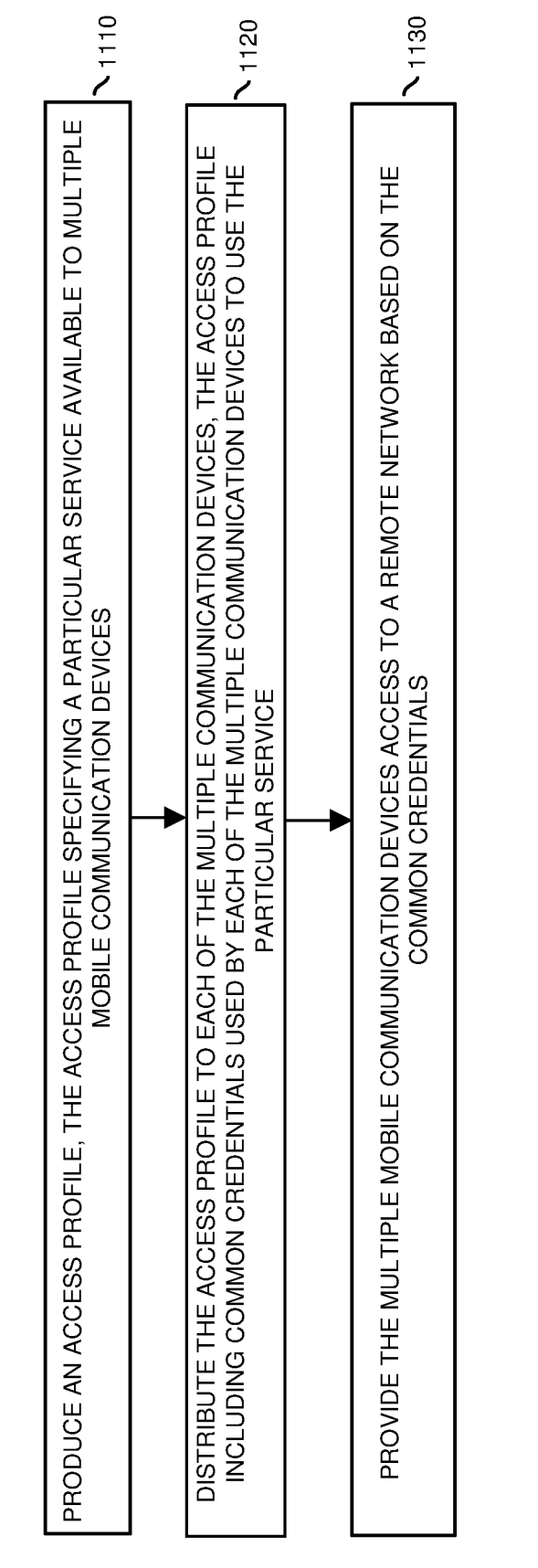

PRODUCE AN ACCESS PROFILE, THE ACCESS PROFILE SPECIFYING A PARTICULAR SERVICE AVAILABLE TO MULTIPLE MOBILE COMMUNICATION DEVICES
1110

DISTRIBUTE THE ACCESS PROFILE TO EACH OF THE MULTIPLE COMMUNICATION DEVICES, THE ACCESS PROFILE INCLUDING COMMON CREDENTIALS USED BY EACH OF THE MULTIPLE COMMUNICATION DEVICES TO USE THE PARTICULAR SERVICE
1120

PROVIDE THE MULTIPLE MOBILE COMMUNICATION DEVICES ACCESS TO A REMOTE NETWORK BASED ON THE COMMON CREDENTIALS
1130

ANONYMOUS NETWORK ACCESS IN A NETWORK ENVIRONMENT

RELATED APPLICATION

This application is a divisional application of earlier filed U.S. patent application Ser. No. 17/241,587 entitled "ANONYMOUS NETWORK ACCESS IN A NETWORK ENVIRONMENT,", filed on Apr. 27, 2023, the entire teachings of which are incorporated herein by this reference.

BACKGROUND

Management of different credentials for each of multiple mobile communication devices and corresponding network access is complex. For example, a service provider may provide wireless access to thousands and thousands of subscribers. Each subscriber typically has a unique username and corresponding password. Each device is assigned a unique network address. A conventional authentication management system must keep track of different credentials associated with each communication device in order to provide network access.

During authentication of a respective mobile communication device, an authentication management resource must first receive appropriate credentials from a mobile communication device before providing the mobile communication device wireless network access. In such an instance, the authentication management resource must receive a username and password from a respective mobile communication device. After verification of the unique information assigned to the requesting mobile communication device, the authentication management resource provides the corresponding device access to the remote network.

BRIEF DESCRIPTION OF EMBODIMENTS

Embodiments herein provide novel ways of providing one or more mobile communication devices improved access to a wireless network.

More specifically, communication management hardware receives a network access request from first user equipment in a network environment. In response to receiving the request, the communication management resource establishes a communication link with the first user equipment. In one embodiment, the communication management resource receives a notification from the first user equipment over the communication link. The notification includes access credentials assigned to a particular service requested for use by the first user equipment. Thus, when requesting use of the particular service selected by the first user equipment, the first user equipment (as well as other instances of user equipment) provide the same access credentials associated with that service during authentication.

In further example embodiments, the network access request for use of the service includes outer identity information specifying the particular service requested by the first user equipment. Am, in one embodiment, the same access credentials assigned to the particular service are repeatedly used by each of multiple mobile communication devices to use the particular service.

In still further example embodiments, the access credentials assigned to the particular service include an anonymous username assigned to the particular service. The first user equipment uses the anonymous username during first level authentication with the communication management resource.

In further example embodiments, the established communication link is a secured wireless communication link supporting encrypted communications. The notification communicated over the secured communication link includes so-called inner identity information provided by the first user equipment to use the particular requested service. In one embodiment, the so-called inner identity information is an anonymous username credential assigned to the particular service requested by the first user equipment. Additionally, or alternatively, the inner identity information specifies a password assigned to the particular service requested by the first user equipment.

Further embodiments herein include, via the communication management resource, receiving, in the network access request from the first user equipment, a first instance of a unique identifier value (such as a network address) assigned to the first user equipment; storing the first instance of the unique identifier value; and comparing a second instance of the unique identifier value received from a gateway to the previously stored first instance of the unique identifier value.

In further example embodiments, the communication management resource receives the second instance of the unique identifier value (such as network address associated with the first user equipment) in a message from the gateway; the gateway requests permission to provide the first user equipment access to a remote network. In response to detecting a match of the second instance of the unique identifier value received in the message to the first instance of the unique identifier value received in the network access request, the communication management resource notifies the gateway to provide the first user equipment access to the remote network.

In still further embodiments, the network access request is generated in response to the first user equipment requesting retrieval of a web page through a gateway.

Yet further embodiments herein include, via the communication management resource, receiving a message from a gateway through which the first user equipment attempts to access a remote network; the message includes an identity of the first user equipment; mapping an identity of the particular service to an access policy associated with the particular service requested by the first user equipment; and communicating the access policy to the gateway. In one embodiment, the identity of the first user equipment in the message is a network address assigned to the first user equipment; the network access request includes the identity of the first user equipment.

Further embodiments herein include communication management hardware operative to produce an access profile shared by multiple instances of communication devices (user equipment). The access profile specifies a particular service available to multiple mobile communication devices. The communication management hardware distributes the same access profile to each of the multiple communication devices in a wireless network. In one embodiment, the access profile includes common credentials used by each of the multiple communication devices to use the particular service. A communication management resource provides the multiple mobile communication devices access to a remote network based on the common credentials provided to the multiple communication devices.

In further example embodiments, the common credentials associated with the particular service include a particular user-name and/or password. Each of the multiple mobile communication devices is able to repeatedly use the common (i.e., shared) credentials to use the particular service such as wireless network access or other suitable function.

In further example embodiments, the access profile shared amongst multiple users and corresponding mobile communication devices (multiple instances of user equipment) specifies multiple services available to each of the multiple mobile communication devices, the particular service being one of the multiple services.

In still further embodiments, the common credentials include an anonymous username credential assigned to the particular service. In one embodiment, the common credentials include inner identity information assigned for use by the multiple users to use the particular service.

Embodiments herein are useful over conventional techniques because they simplify management of credentials associated with different users. For example, instead of assigning a different unique username and password to each of multiple users, embodiments herein include assigning an anonymous credential to a respective service. Each of multiple users then share the same credentials (such as an anonymous username for the specific service and corresponding password for the service) to use the requested service. This alleviates the need to track different username and password information for each user.

Note that any of the resources as discussed herein can include one or more computerized devices, communication management resources, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (such as any computer readable hardware storage medium, computer readable storage hardware, etc.) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage hardware medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed on a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to provide efficient use of wireless resources in a network environment. The instructions, when executed by computer processor hardware, cause the computer processor hardware (such as one or more co-located or disparately processor devices or hardware) to: receive a network access request from first user equipment in a network environment; establish a communication link with the first user equipment in response to receiving the network access request; and receive a notification from the first user equipment over the communication link, the notification including access credentials assigned to a particular service requested by the first user equipment.

Another embodiment herein includes a computer readable storage medium and/or system having instructions stored thereon to provide efficient use of wireless resources in a network environment. The instructions, when executed by computer processor hardware, cause the computer processor hardware (such as one or more co-located or disparately processor devices or hardware) to: produce an access profile, the access profile specifying a particular service available to multiple mobile communication devices; distribute the access profile to each of the multiple communication devices, the access profile including common credentials used by each of the multiple communication devices to use the particular service; and provide the multiple mobile communication devices access to a remote network based on the common credentials.

Note that the ordering of the steps above has been added for clarity sake. Further note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing communication services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention (s), the reader is directed to the Detailed Description section (which is a further summary as well as detailed description) and corresponding figures of the present disclosure as further discussed below.

BRIEF DESCRIPTION OF THE DRAWINGS

FIG. 6 is an example diagram illustrating second level authentication according to embodiments herein.

FIG. 10 is an example diagram illustrating a method according to embodiments herein.

FIG. 11 is an example diagram illustrating a method according to embodiments herein.

Figure 1:
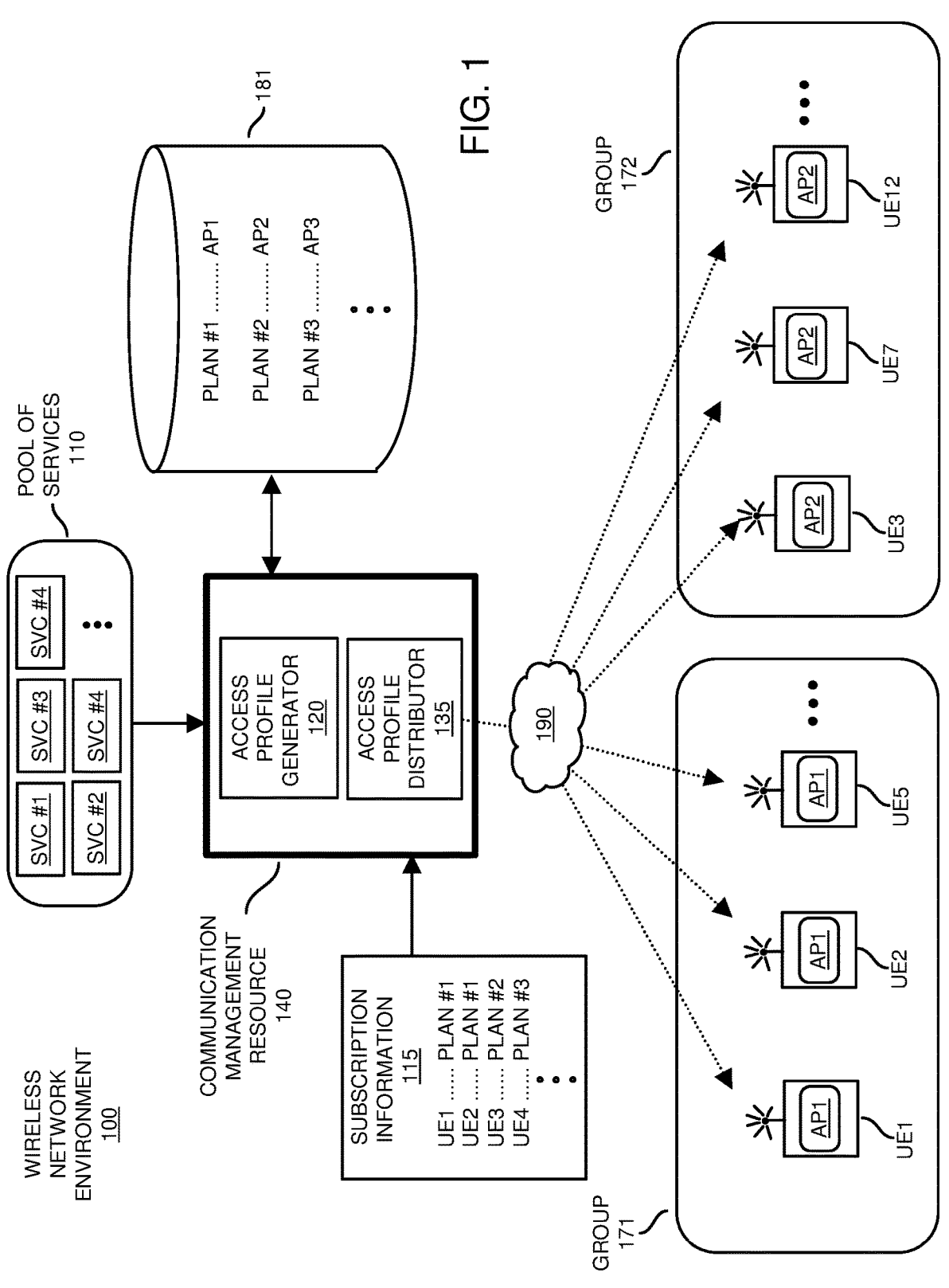
FIG. 1 is an example diagram illustrating a communication system implementing access profiles and authentication according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Embodiments herein further include installing a same wireless network access profile on multiple user devices. The wireless network access profile allows each device to connect to secured Wi-Fi networks. For example, in one embodiment, rather than the credentials in the wireless network access profile identifying the user as is typically done, the credentials in the wireless network access profile are anonymous and identify the network services to which the device can use. During access, the device connects to the secured network (such as Wi-Fi™ or other type of network) based on the realms and domains advertised by the network and corresponding credentials in its wireless network access profile. A policy server validates the credentials presented by the device and, based on the credentials, notifies a network gateway of an access policy to apply to communications associated with the communication device requesting network access. The network gateway enforces access in accordance with the access policy, whether it be to specific network resources or a connection to the Internet.

Thus, a same wireless access profile is installed on each of multiple mobile communication devices (a.k.a., instances of user equipment). The wireless access profile includes outer identity information and anonymous inner identity information for a particular service. The anonymous inner identity information includes same credentials used by each of the multiple mobile communication devices to use the service. To access the remote network, a respective mobile communication device communicates an anonymous username and a password assigned to the service to a policy server (a.k.a., authentication management resource) during first level authentication. The policy server stores a network address of the authenticated mobile communication device. During second level authentication, the policy server receives an identity of the mobile communication device from a network gateway potentially providing access service to the mobile communication device. The policy server provides access control information (associated with the requested service) to the network gateway. The network gateway then provides access to the mobile communication device in accordance with the access control information provided by the policy server.

Now, more specifically, with reference to the drawings, FIG. 1 is an example diagram illustrating a communication system implementing generation and implementation of access profiles according to embodiments herein.

As shown, wireless network environment 100 includes pool of services 110 (including wireless network service #1, wireless network service #2, wireless network service #3, wireless network service #4, wireless network service #5, etc.), communication management resource 140, subscription information 115, repository 181, network 190, and multiple groups 171, 172, etc., of user equipment (communication devices, mobile communication devices, etc.).

Communication management resource 140 includes access profile generator 120 and access profile distributor 135.

Group of user equipment 171 includes user equipment UE1, user equipment UE2, user equipment UE5, etc. Group of user equipment 172 includes user equipment UE3, user equipment UE7, user equipment UE12, etc.

Note that each of the resources as discussed herein can be configured to operate as hardware, executed software, or a combination of hardware and software.

More specifically, the communication management resource 140 as discussed herein can be implemented as communication management hardware, communication management software, or a combination of communication management hardware and communication management software; each instance of user equipment can be implemented as user equipment hardware, user equipment software, or a combination of user equipment hardware and user equipment software; access profile generator 120 can be implemented as access profile generator hardware, access profile generator software, or a combination of access profile generator hardware and access profile generator software; access profile distributor 135 can be implemented as access profile distributor hardware, access profile distributor software, or a combination of access profile distributor hardware and access profile distributor software; and so on.

Each of the wireless network services in the pool of services 110 supports a different type of wireless network access. For example, as its name suggests, the wireless network service #1 (i.e., SVC #1) supports a first wireless network service provided by a network service provider; the wireless network service #2 (i.e., SVC #2) supports a second wireless network service provided by the network service provider; the wireless network service #3 (i.e., SVC #3) supports a second wireless network service provided by the network service provider; the wireless network service #4 (i.e., SVC #4) supports a second wireless network service provided by the network service provider; and so on.

Assume in this example embodiment that the wireless network service provider offers multiple different wireless network access plans such as plan #1, plan #2, plan #3, etc., to respective subscribers. Assume further that the plan #1 includes service #1, service #2, and service #4; plan #2 includes service #3, service #5, and service #6, and so on.

As further shown, the access profile generator 120 produces a respective access profile associated which each of the available plans. For example, access profile generator 120 produces access profile AP1 to support access plan #1; access profile generator 120 produces access profile AP2 to support access plan #2; access profile generator 120 produces access profile AP3 to support access plan #3 and so on.

Each access profile generated by the access profile generator 120 includes appropriate information such as credentials supporting the corresponding wireless network service. An example of the information associated with each of the access profiles is shown in FIG. 2.

Figure 2:
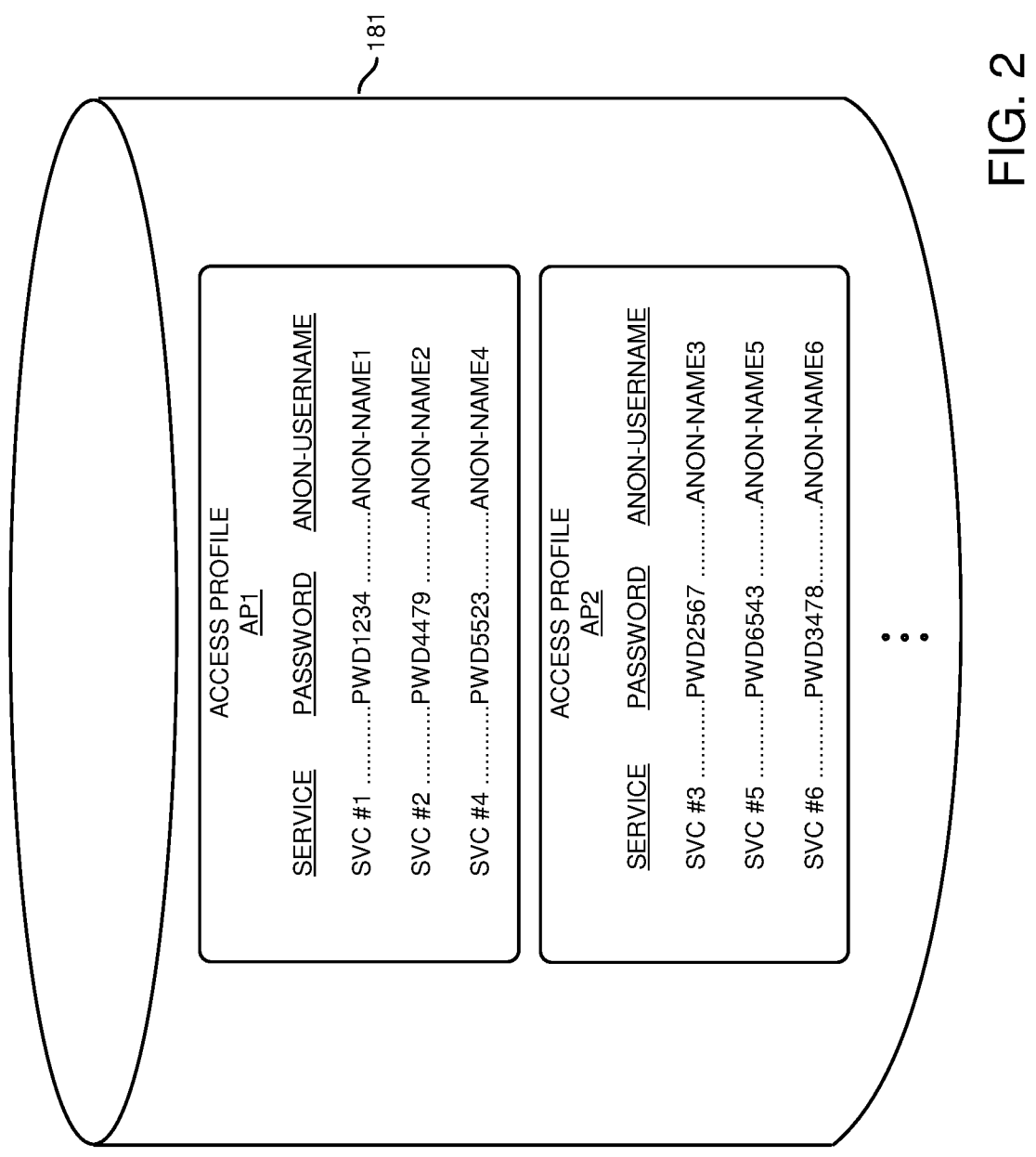
FIG. 2 is an example diagram illustrating multiple access profiles and corresponding credentials according to embodiments herein.

FIG. 2 is an example diagram illustrating multiple access profiles and corresponding credentials according to embodiments herein.

In this example embodiment, the access profile AP1 stored in repository 180 includes credentials associated with each of the corresponding services service 1, service #2, and service #4. Service #1 is assigned credentials such as password value PWD1234 and anonymous username value ANON-NAME1; service #2 is assigned credentials such as password value PWD4479 and anonymous username value ANON-NAME2; service #4 is assigned credentials such as password value PWD5523 and anonymous username value ANON-NAME4.

Further in this example embodiment, the access profile AP2 stored in repository 180 includes credentials associated with each of the corresponding services service #3, service #5, and service #6. Service #3 is assigned credentials such as password value PWD2567 and anonymous username value ANON-NAME3; service #5 is assigned credentials such as password value PWD6543 and anonymous username value ANON-NAME5; service #6 is assigned credentials such as password value PWD3478 and anonymous username value ANON-NAME6.

Referring again to FIG. 1, as previously discussed, the communication management resource 140 includes subscription information 115 and access profile distributor 135. The subscription information 115 indicates the different access plans assigned to the different subscribers and corresponding user equipment.

For example, the subscription information 115 indicates that the user equipment UE1 and corresponding user (subscriber) is assigned network access plan #1; the subscription information 115 indicates that the user equipment UE2 and corresponding user (subscriber) is assigned network access plan #1; the subscription information 115 indicates that the user equipment UE3 and corresponding user (subscriber) is assigned network access plan #2; the subscription information 115 indicates that the user equipment UE4 and corresponding user (subscriber) is assigned network access plan #3; and so on.

As further shown, and as its name suggests, the access profile distributor 135 communicates the appropriate access profile to each of the instances of mobile communication devices based on the respective plan to which the corresponding subscriber subscribes.

For example, as previously discussed, the subscriber information 115 indicates that the user equipment UE1 and corresponding user subscribe to plan #1 and therefore are assigned the access profile AP1. In such an instance, the access profile distributor 135 communicates/downloads/installs the access profile AP1 to the user equipment UE1. In one embodiment, the user equipment UE1 includes a local profile assistant operative to communicate with the access profile distributor 135 and install the access profile AP1 onmto the user equipment UE1.

The subscriber information 115 indicates that the user equipment UE2 and corresponding user subscribe to plan #1 and therefore are assigned the access profile AP1. In such an instance, the access profile distributor 135 communicates/downloads/installs the access profile AP1 to the user equipment UE2. In one embodiment, the user equipment UE2 includes a respective local profile assistant operative to communicate with the access profile distributor 135 and install the access profile AP1 onto the user equipment UE2.

The subscriber information 115 indicates that the user equipment UE3 and corresponding user subscribe to plan #2 and therefore are assigned the access profile AP2. In such an instance, the access profile distributor 135 communicates/downloads/installs the access profile AP2 to the user equipment UE3. In one embodiment, the user equipment UE3 includes a local profile assistant operative to communicate with the access profile distributor 135 and install the access profile AP2 onto the user equipment UE3.

The subscriber information 115 indicates that the user equipment UE4 and corresponding user subscribe to plan #3 and therefore are assigned the access profile AP3. In such an instance, the access profile distributor 135 communicates/downloads/installs the access profile AP3 to the user equipment UE4. In one embodiment, the user equipment UE4 includes a local profile assistant operative to communicate with the access profile distributor 135 and install the access profile AP3 onto the user equipment UE4.

Note that the access profiles can be distributed (such as downloaded, installed, etc.) onto a respective communication device in any suitable manner. For example, the access profiles can be distributed over respective one or more wireless communication links to the different instances of user equipment, a shared communication link, physical communication link, etc.

Thus, via access profile distributor 135, the communication management resource 140 communicates access profile AP1 to each of the instances of user equipment UE1, UE2, UE5, etc., in group 171; via access profile distributor 135, the communication management resource 140 communicates access profile AP2 to each of the instances of user equipment UE3, UE7, UE12, etc., in group 172; and so on.

Figure 3:
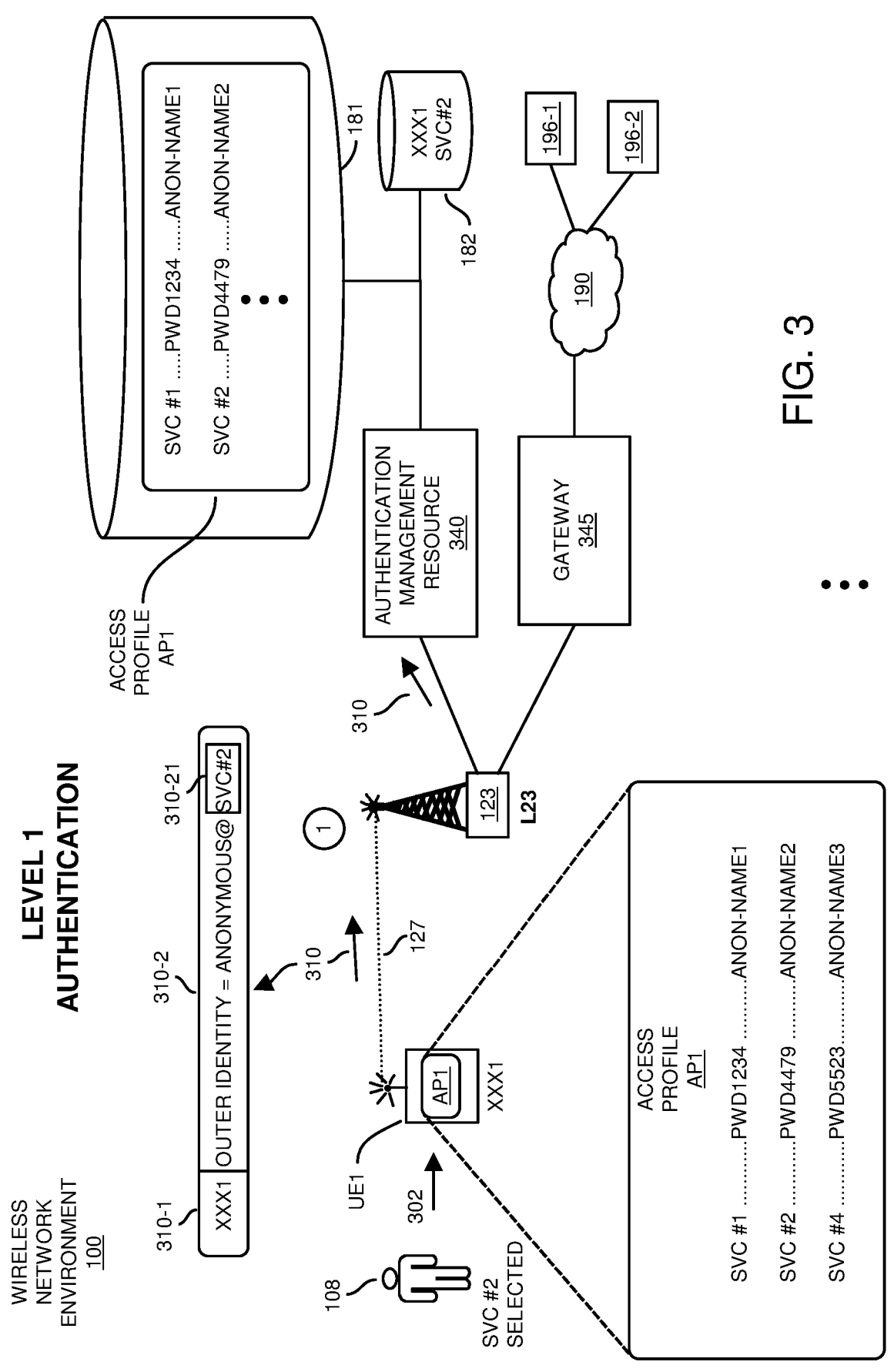
FIG. 3 is an example diagram illustrating first level authentication according to embodiments herein.

FIG. 3 is an example diagram illustrating first level authentication according to embodiments herein.

In this example embodiment, the wireless base station 123 and gateway 345 provide network access to the user equipment UE1 and corresponding user 108 via implementation access profile AP1.

For example, in processing operation #1, via input 302, the user 108 of the user equipment UE1 inputs a command or instruction to use service SVC #2. In one embodiment, the input 302 is a network access request generated in response to the user 108 of user equipment UE1 requesting retrieval of a web page through a gateway 345.

In response to receiving the input 302, the user equipment UE1 establishes wireless connectivity 127 and communicates a corresponding request 310 to and through wireless base station 123 to the authentication management resource 340.

Communication link 127 supports any suitable wireless communication protocol. In one embodiment, the communication link 127 supports secured wireless access via Wi-Fi™.

In one embodiment, the request 310 (communications) includes multiple data fields such as data field 310-1, data field 310-2, and so on. In this example embodiment, the data field 310-2 includes a sub-data field 310-21.

During level 1 authentication of the user equipment UE1, the user equipment UE1 communicates a unique identifier value XXX1 of the user equipment such as a network address, MAC address, etc., in the data field 310-1. Additionally, the user equipment UE1 communicates information such as OUTER IDENTITY=ANONYMOUS@SVC #2 in the data field 310-2. Inclusion of the value SVC #2 in sub-data field 310-21 indicates that the user 108 and corresponding user equipment UE1 request use of wireless network service SVC #2.

Note that the user equipment UE1 includes a different value in the sub-data field 310-21 depending on the service desired by the user 108 and corresponding user equipment UE1. For example, the user equipment UE1 populates the sub-data field 310-21 to include the value SVC #1 in sub-data field 310-21 in response to detecting that the user 108 and corresponding user equipment UE1 request use of wireless network service SVC #1; the user equipment UE1 populates the sub-data field 310-21 to include the value SVC #2 in sub-data field 310-21 in response to detecting that the user 108 and corresponding user equipment UE1 request use of wireless network service SVC #2; the user equipment UE1 populates the sub-data field 310-21 to include the value SVC #4 in sub-data field 310-21 in response to detecting that the user 108 and corresponding user equipment UE1 request use of wireless network service SVC #4; and so on.

As previously discussed, in this example embodiment, based on receipt of the communication 310 in this example embodiment, and inclusion of the value SVC #2 in the data field 310-21, the authentication management resource 340 is notified that the user equipment UE1 is requesting use of wireless network service SVC #2.

In response to receiving the request 310, the authentication management resource 340 stores an identity (XXX1) of the user equipment UE1 and the requested service SVC #2 associated with the request 310 in the repository 182.

Figure 4:
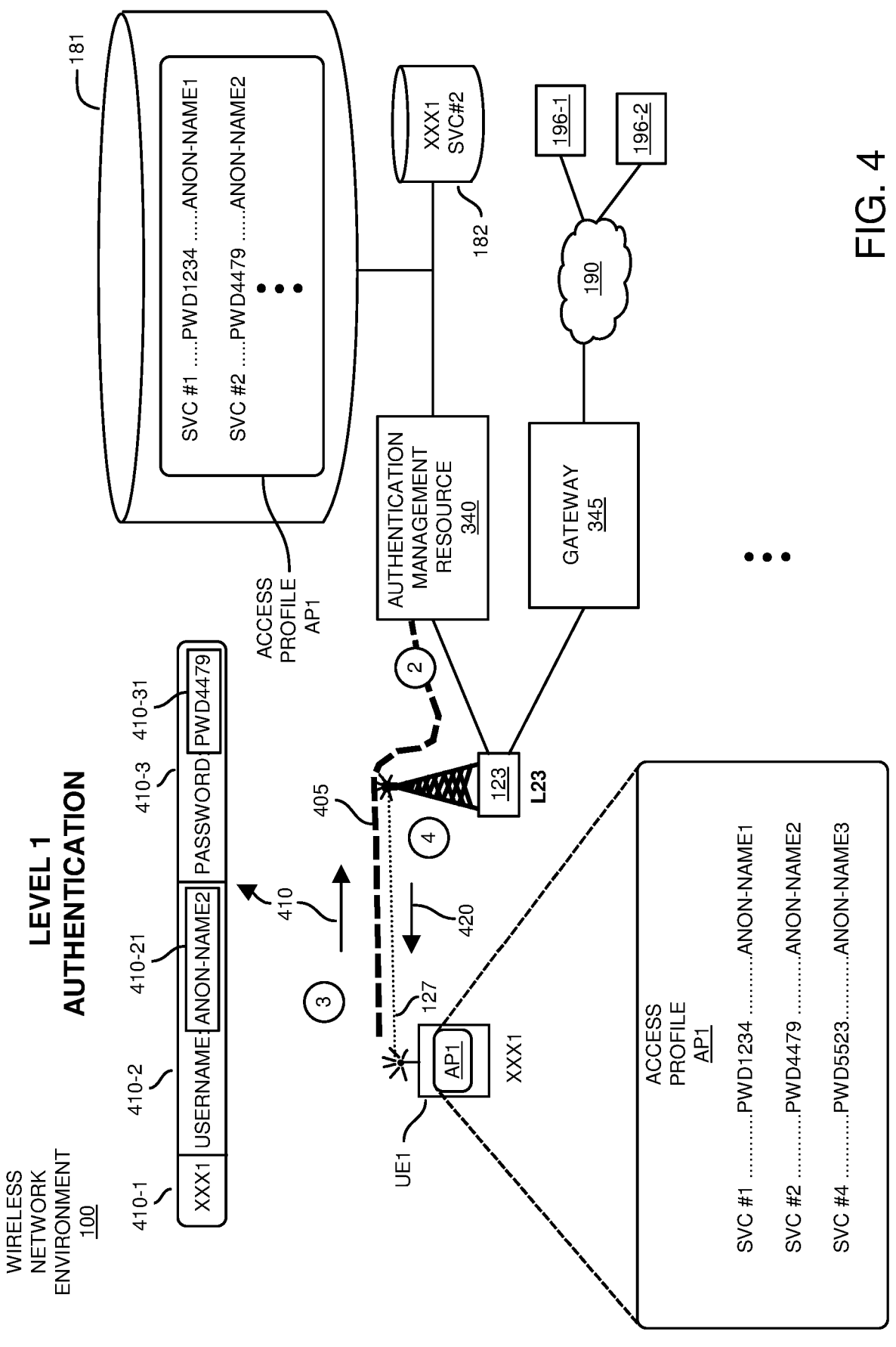
FIG. 4 is an example diagram illustrating first level authentication according to embodiments herein.

FIG. 4 is an example diagram illustrating a continuation of first level authentication according to embodiments herein.

In processing operation #2, in response to receiving the request 310, the authentication management resource 340 and the user equipment UE1 establish the secured communication link 405 such as a so-called tunnel via any suitable communication protocol. In one embodiment, the communication device UE1 and authentication management resource 340 use the communication link 405 to support encrypted communications (such as communications 410, 420, etc.), preventing unauthorized parties from accessing data in the communications conveyed between the user equipment UE1 and the authentication management resource 340 (a.k.a., a communication management resource).

In processing operation #3, in furtherance of using the requested service SVC #2, the user equipment UE1 transmits communications 410 (inner identity and other information) over the secured communication link 405 over wireless communication link 127 and through the wireless base station 123 to the authentication management resource 340.

In one embodiment, as shown, the communication 410 includes multiple data fields such as data field 410-1, data field 410-2, data field 410-3, etc. The user equipment UE1 populates these data fields of the communication 410 to include information associated with the request to use service SVC #2.

For example, the user equipment UE1 populates the data field 410-1 to include the unique identifier value XXX1 (such as network address or other suitable value) assigned to the user equipment UE1. In one embodiment, the user equipment UE1 maps requested service SVC #2 to password=PWD4479 and username=ANON-NAME2.

The user equipment UE1 populates the data field 410-2 to include the value USERNAME:ANON-NAME2 retrieved from the access profile AP1 assigned to the user equipment UE1. The sub-data field 410-2 populated by the user equipment UE1 includes the username information value ANON-NAME2 retrieved from the access profile AP1.

The user equipment UE1 further populates the data field 410-3 to include the value PASSWORD:PWD4479 retrieved from the access profile AP1 assigned to the user equipment UE1. The sub-data field 410-31 includes the username information value PWD4479 retrieved from the access profile AP1.

Further, in processing operation #3, the authentication management resource 340 verifies (authenticates) the received credentials in communication 410. For example, the authentication management resource 340 knows from previous communications that the user equipment UE1 requested service SVC #2 based on received outer identity information. Based on comparing the received credentials to the password and username stored in repository 181 for service SVC #2, the authentication management resource 340 determines that the user equipment UE1 is authorized to use requested service SVC #2 (such as wireless access to the network 190 through a wireless base station). In other words, the information ANON-NAME2 and PWD4479 in communication 410 matches the information ANON-NAME2 and PWD4479 stored in repository for service SVC #2.

In response to the authentication of the user equipment UE1 in processing operation #3, the authentication management resource 340 transmits communication 420 (such as Radius Access-Accept message or other suitable message) to the user equipment UE1 in processing operation #4. The communication 420 received by the user equipment UE1 indicates that the request for wireless network service SVC #2 is granted by the authentication management resource 340.

Figure 5:
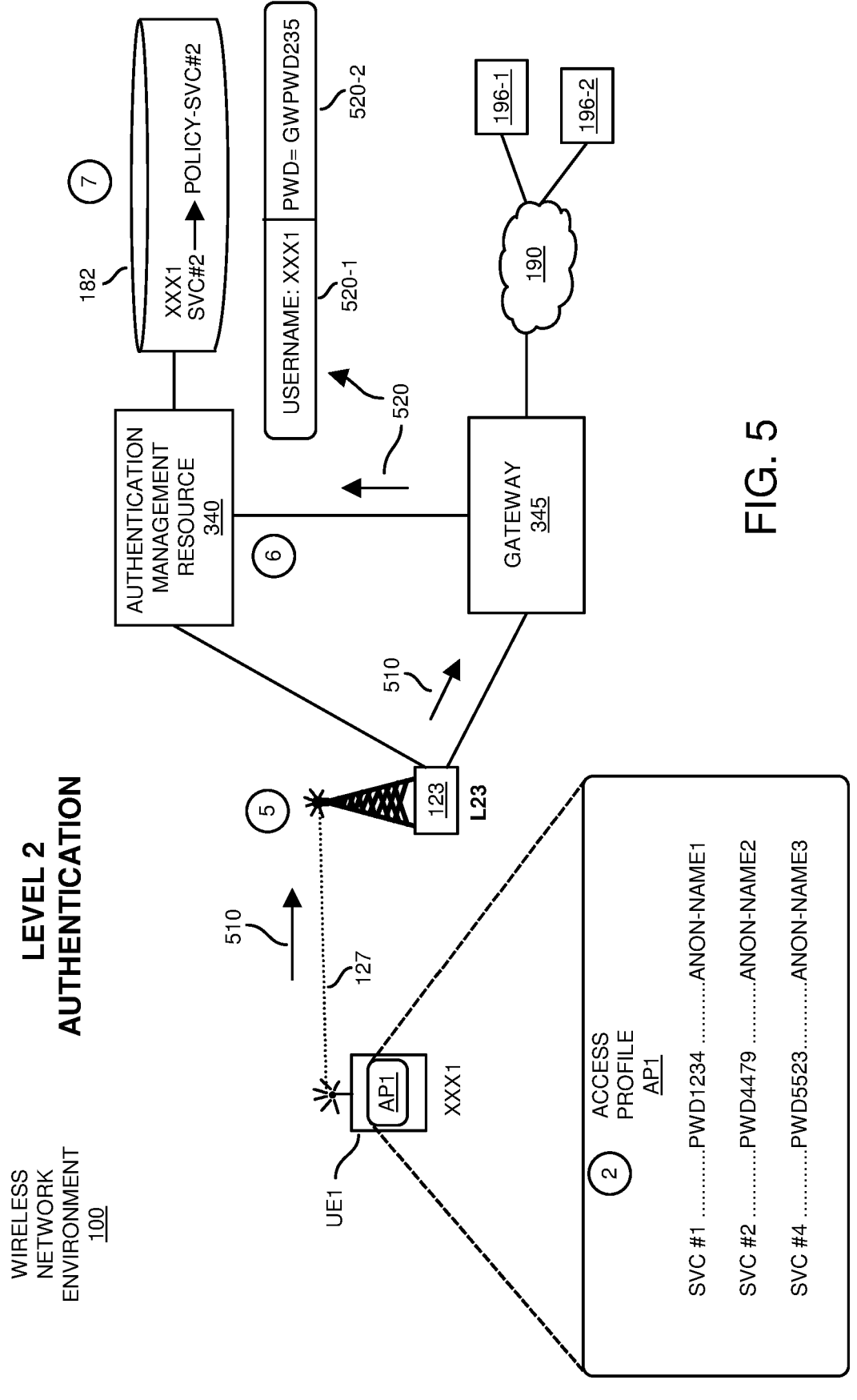
FIG. 5 is an example diagram illustrating second level authentication according to embodiments herein.

FIG. 5 is an example diagram illustrating second level authentication according to embodiments herein.

In processing operation #5, via communications 510, the user equipment UE1 transmits communication 510 over the wireless communication link 127 to the wireless base station. The wireless base station forwards the communication 510 to the gateway 345. In one embodiment, the communications 510 include a request for retrieval of content (such as web page information) from one or more server resources 196-1, 196-2, etc., in the wireless network environment 100.

In response to receiving the request for content, in processing operation #6, the gateway 345 transmits communications 520 to the authentication manager resource 340.

In one embodiment, the gateway 345 populates the data field 520-1 of communication 520 to include the unique identifier value XXX1 assigned to the user equipment UE1. This notifies the authentication manager resource 340 of the communication device requesting access to the network 190. The gateway 345 further populates the data field 520-2 with the value PWD=GWPD235. In one embodiment, the value GWPWD235 in the sub-data field 520-2 represents a password notifying the authentication management resource that the gateway 345 is part of the service provider's network. In other words, the password in the communication 520 notifies the authentication manager resource 340 that the gateway 345 is a legitimate part of the service provider's network.

As further shown, in processing operation #7, in response to receiving the communications 520 and permission to provide the user equipment UE1 assigned the unique identifier value XXX1 access to the network 190, the authentication manager resource 340 maps the requested service SVC #2 to an appropriate access policy (POLICY-SVC #2) stored in the repository 182. In one embodiment, the POLICY-SVC #2 indicates one or more parameters (such as specific web sites that can be accessed, retrieval data bit rates, filters, allowed times to provide access, etc.) associated with providing the user equipment UE1 access to the network 190.

Figure 6:
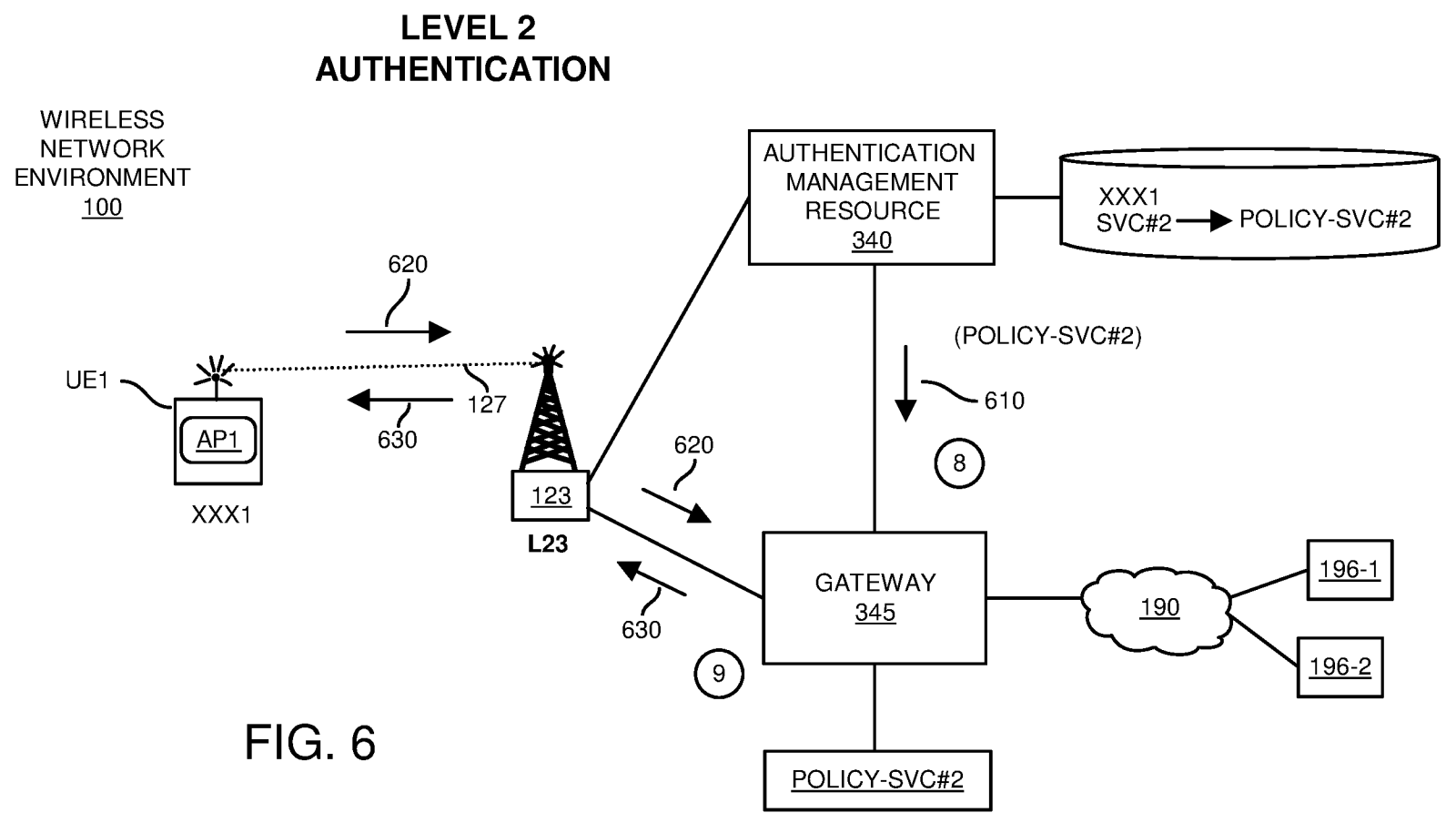

FIG. 6 is an example diagram illustrating second level authentication according to embodiments herein.

In processing operation #8, the authentication manager resource 340 communicates the selected policy (i.e., POLICY-SVC #2) in communication 610 to the gateway 345. In such an instance, the gateway 345 has knowledge of the specific policy (i.e., POLICY-SVC #2) in which to provide the user equipment UE1 access to the network 190 via communications over the wireless communication link 127 and through the gateway 345.

In processing operation #9, in accordance with the applied policy (i.e., POLICY-SVC #2), the gateway 345 forwards received communications 620 over network 190 to the appropriate target server resource. The target server resource transmits communications 630 in reverse direction through network 190, gateway 345, and wireless base station 123 to the user equipment UE1 over the wireless communication link 127.

Figure 7:
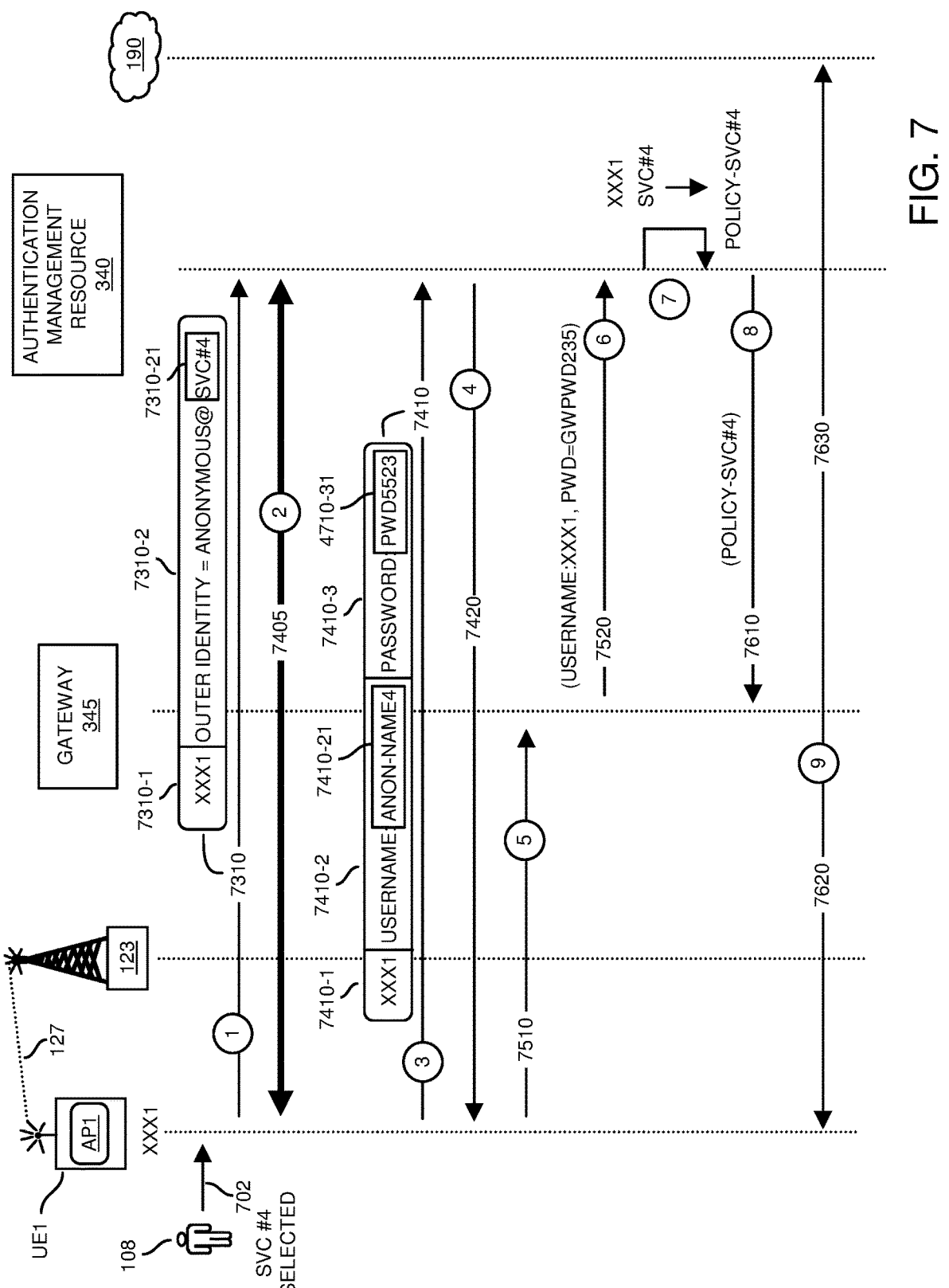
FIG. 7 is an example timing diagram illustrating communications supporting anonymous authentication and access to a first communication device according to embodiments herein.

FIG. 7 is an example timing diagram illustrating communications supporting anonymous authentication and subsequent network access according to embodiments herein.

In this example embodiment, in processing operation #1, via input 702, assume that the user 108 of the user equipment UE1 inputs a command to use wireless network service SVC #4 associated with the access profile AP1 assigned to the user equipment UE1.

In response to receiving the input 702, the user equipment UE1 establishes wireless connectivity 127 and communicates a corresponding communication 7310 (such as request communication) to and through wireless base station 123 to the authentication management resource 340.

In one embodiment, as shown, the communications 7310 include multiple data fields such as data field 7310-1, data field 7310-2, and so on. In this example embodiment, the data field 7310-2 includes a sub-data field 7310-21.

During level 1 authentication of the user equipment UE1, the user equipment UE1 communicates a unique identifier value XXX1 of the user equipment such as a network address, MAC address, etc., assigned to the user equipment UE1 in the data field 7310-1. Additionally, the user equipment UE1 communicates information such as data OUTER IDENTITY=ANONYMOUS @SVC #4 in the data field 7310-2. Inclusion of the value SVC #4 in sub-data field 7310-21 indicates that the user 108 and corresponding user equipment UE1 request use of wireless network service SVC #4.

Based on receipt of the communications 7310 in this example embodiment, and inclusion of the value SVC #4 in the data field 7310-21, the authentication management resource 340 is notified that the user equipment UE1 is requesting use of wireless network service SVC #4.

In response to receiving the communications 7310, the authentication management resource 340 stores an identity of the user equipment UE1 and the requested service SVC #4 associated with the communications 7310 in the repository 182.

In processing operation #2, in response to receiving the communications 7310 (such as request to use wireless service SVC #4), the authentication management resource 340 and the user equipment UE1 establish the secured communication link 7405 such as a tunnel via any suitable communication protocol. In one embodiment, the communication device UE1 and authentication management resource 340 use the secured communication link 7405 to support encrypted communications, preventing unauthorized parties from accessing data in the communications conveyed between the user equipment UE1 and the authentication management resource 340.

In processing operation #3, in furtherance of using the requested service SVC #4, the user equipment UE1 transmits communications 7410 (inner identity and other information) over the secured communication link 7405 over wireless communication link 127 and through the wireless base station 123 to the authentication management resource 340.

In one embodiment, as shown, the communication 7410 includes multiple data fields such as data field 7410-1, data field 7410-2, data field 7410-3, etc. The user equipment UE1 populates the data fields of the communication 7410 to include information associated with the request to use wireless network service SVC #4. More specifically, the user equipment UE1 populates the data field 7410-1 to include the unique identifier value XXX1 (such as network address or other suitable value) assigned to the user equipment UE1. The user equipment UE1 maps requested service SVC #4 to credentials including password=PWD5523 and username=ANON-NAME4 and includes such information in the communication 7410. In a manner as previously discussed, the user equipment UE1 retrieves the password=PWD5523 and username=ANON-NAME4 associated with the service SERVICE #4 from the access profile AP1.

Further in this example embodiment, the user equipment UE1 populates the data field 7410-2 to include the value USERNAME:ANON-NAME4 retrieved from the access profile AP1 assigned to the user equipment UE1. The sub-data field 7410-2 includes the username information value ANON-NAME2 retrieved from the access profile AP1.

The user equipment UE1 further populates the data field 7410-3 to include the value PASSWORD:PWD5523 retrieved from the access profile AP1 assigned to the user equipment UE1. The sub-data field 7410-31 includes the username information value PWD5523 retrieved from the access profile AP1.

Further, in processing operation #3, the authentication management resource 340 verifies (authenticates) the received credentials in communication 7410. For example, the authentication management resource 340 knows from previous communications that the user equipment UE1 requested service SVC #4 based on received outer identity information (communications 7310). Based on comparing the received credentials in communication 7410 to the required the password and username stored in repository 181 for service SVC #4, the authentication management resource 340 determines that the user equipment UE1 is authorized to use requested service SVC #4 (such as wireless access to the network 190 through a wireless base station) based on comparing that the receives credentials match the credentials associated with the service SVC #4.

In response to the authentication of the user equipment UE1 in processing operation #3, and receiving proper credentials in communication 7410, the authentication management resource 340 transmits communication 7420 (such as Radius Access-Accept message or other suitable message) to the user equipment UE1 in processing operation #4. The communication 7420 indicates that the request for wireless network service SVC #4 is granted by the authentication management resource 340.

As further shown, in processing operation #5, via communications 7510, the user equipment UE1 transmits communication 7510 over the wireless communication link 127 to the wireless base station. The wireless base station forwards the communications 7510 to the gateway 345. In one embodiment, the communications 7510 include a request for retrieval of content from one or more server resources 196 in the wireless network environment 100.

In response to receiving the communication 7510 such as a request for content, in processing operation #6, the gateway 345 transmits communications 7520 to the authentication manager resource 340. In one embodiment, the gateway 345 populates the data field 7520-1 of communications 7520 to include the unique identifier value XXX1 assigned to the user equipment UE1. This notifies the authentication manager resource 340 of the communication device requesting access to the network 190. The gateway 345 further populates the communications 7520 to include value PWD=GWPD235. In one embodiment, the value GWPWD235 represents a password notifying the authentication management resource 340 that the gateway 345 is part of the service provider's network.

As further shown, in processing operation #7, in response to receiving the communications 7520 and permission to provide the user equipment UE1 assigned the unique identifier value XXX1 access to the network 190, the authentication management resource 340 maps the requested service SVC #4 to an appropriate access policy (POLICY-SVC #4) stored in the repository 182 or other suitable entity. In one embodiment, the POLICY-SVC #4 indicates one or more parameters (such as specific web sites that can be accessed, retrieval data bit rates, filters, allowed times, etc.) associated with providing the user equipment UE1 access to the network 190.

In processing operation #8, the authentication manager resource 340 communicates the selected policy POLICY-SVC #4 or notification of the selected policy in communication 7610 to the gateway 345. In such an instance, the gateway 345 has knowledge of the specific policy (i.e., POLICY-SVC #4) in which to provide the user equipment UE1 access to the network 190 via communications over the wireless communication link 127 and through the gateway 345.

In processing operation #9, in accordance with the applied policy (i.e., POLICY-SVC #4), the gateway 345 forwards received communications 7620 over network 190 to the appropriate target server resource. The target server resource and network 190 transmit communications 7630 in reverse direction through network 190, gateway 345, and wireless base station 123 to the user equipment UE1 over the wireless communication link 127.

Eventually, the user 108 discontinues use of the wireless service SVC #4. In such an instance, the user equipment UE1 terminates the wireless communication link 127 between the user equipment and the wireless base station 123. Each subsequent time that the user 108 wishes to access network 190, embodiments herein include repeating the process as shown in FIG. 7. Thus, the access profile AP1 and corresponding information serve as long term credentials in which to access network 190.

Figure 8:
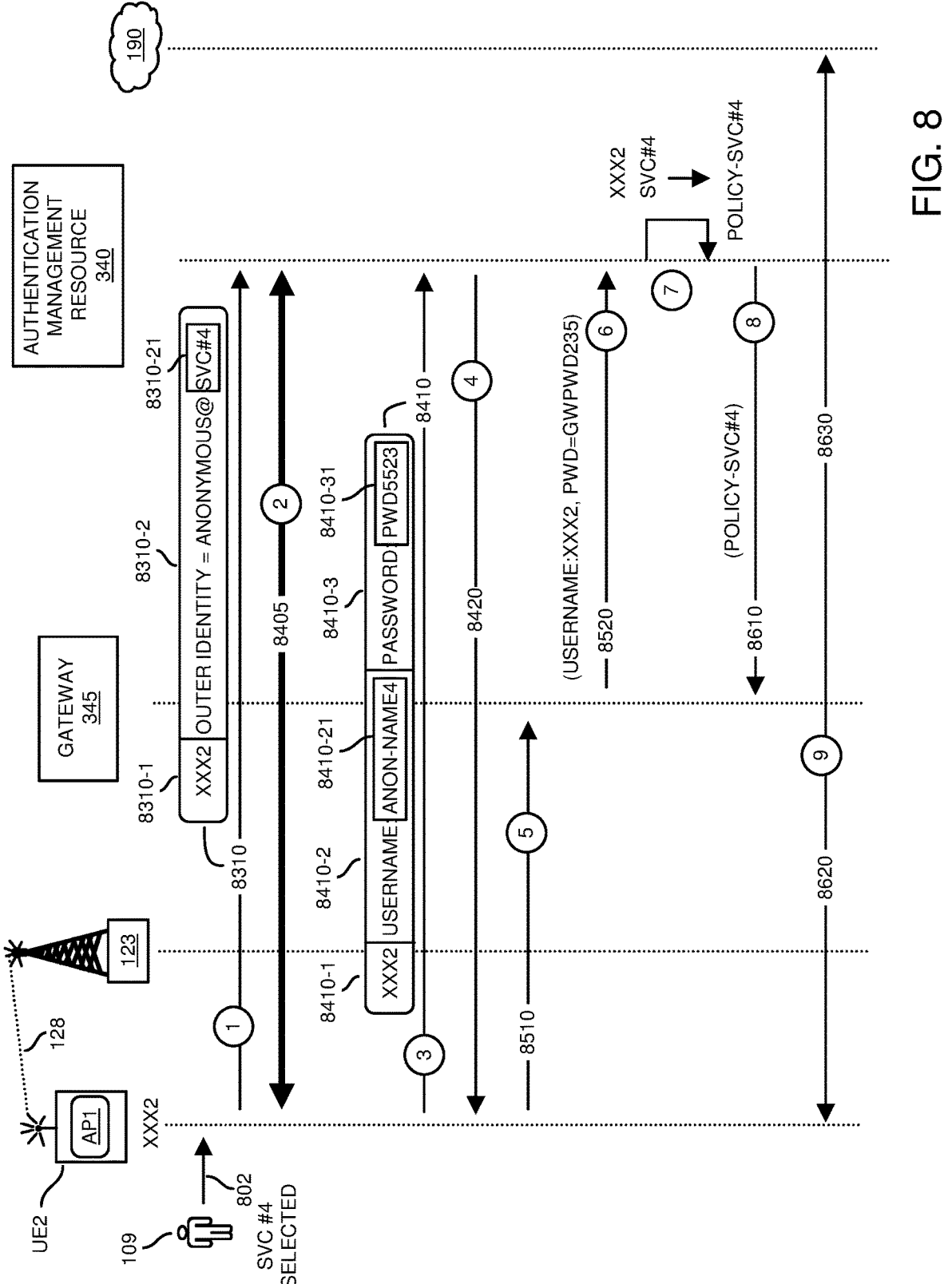
FIG. 8 is an example timing diagram illustrating communications supporting anonymous authentication and access to a second communication device according to embodiments herein.

FIG. 8 is an example timing diagram illustrating communications supporting anonymous authentication and subsequent network access according to embodiments herein.

As previously discussed, embodiments herein include multiple instances of communication devices sharing the same access profile and corresponding credentials to access the network 190. This eliminates the need to track unique credentials associated with each of the multiple communication devices, simplifying a task of authenticating the communication devices for use. In other words, as previously discussed, common credentials assigned to a particular wireless network service are supplied to multiple communication devices that use the common credentials during authentication of using the particular service.

As previously discussed, user equipment UE2 is also assigned the access profile AP1 in a similar manner that user equipment UE1 is assigned the access profile AP1.

In this example embodiment, in processing operation #1, via input 802, the user 109 of the user equipment UE2 inputs a command to use wireless network service SVC #4 associated with the access profile AP1 assigned to the user equipment UE2.

In response to receiving the input 802, the user equipment UE2 establishes wireless connectivity 128 and communicates a corresponding communication 8310 (such as request communication) to and through wireless base station 123 to the authentication management resource 340.

In one embodiment, the communications 8310 include multiple data fields such as data field 8310-1, data field 8310-2, and so on. In this example embodiment, the data field 8310-2 includes a sub-data field 8310-21.

During level 1 authentication of the user equipment UE2, the user equipment UE2 communicates a unique identifier value XXX2 of the user equipment such as a network address, MAC address, etc., assigned to the user equipment UE2 in the data field 8310-1. Additionally, the user equipment UE2 communicates information such as data OUTER IDENTITY=ANONYMOUS @SVC #4 in the data field 8310-2. Inclusion of the value SVC #4 in sub-data field 8310-21 indicates that the user 108 and corresponding user equipment UE2 request use of wireless network service SVC #4.

Based on receipt of the communications 8310 in this example embodiment, and inclusion of the value SVC #4 in the data field 8310-21, the authentication management resource 340 is notified that the user equipment UE2 is requesting use of wireless network service SVC #4.

In response to receiving the communications 8310, the authentication management resource 340 stores an identity of the user equipment UE1 and the requested service SVC #4 associated with the communications 8310 in the repository 182.

In processing operation #2, in response to receiving the communications 8310 (such as request to use wireless service SVC #4), the authentication management resource 340 and the user equipment UE2 establish the secured communication link 8405 such as a tunnel via any suitable communication protocol. In one embodiment, the communication device UE2 and authentication management resource 340 use the secured communication link 8405 to support encrypted communications (such as communications 8410, 8420, etc.), preventing unauthorized parties from accessing data in the communications conveyed between the user equipment UE2 and the authentication management resource 340.

In processing operation #3, in furtherance of using the requested service SVC #4, the user equipment UE2 transmits communications 8410 (inner identity and other information) over the secured communication link 8405 over wireless communication link 128 and through the wireless base station 123 to the authentication management resource 340.

In one embodiment, as shown, the communication 8410 includes multiple data fields such as data field 8410-1, data field 8410-2, data field 8410-3, etc. The user equipment UE2 populates the data fields of the communication 8410 to include information associated with the prior request to use wireless network service SVC #4.

More specifically, the user equipment UE2 populates the data field 8410-1 to include the unique identifier value XXX2 (such as network address or other suitable value) assigned to the user equipment UE2. The user equipment UE2 maps requested service SVC #4 to credentials including password=PWD5523 and username=ANON-NAME4 and includes such information in the communication 8410.

Further in this example embodiment, the user equipment UE2 populates the data field 8410-2 to include the value USERNAME:ANON-NAME4 retrieved from the access profile AP1 assigned to the user equipment UE2. The sub-data field 8410-2 includes the username information value ANON-NAME2 retrieved from the access profile AP1.

The user equipment UE2 further populates the data field 8410-3 to include the value PASSWORD:PWD5523 retrieved from the access profile AP1 assigned to the user equipment UE2. The sub-data field 8410-31 includes the username information value PWD5523 retrieved from the access profile AP1.

Further, in processing operation #3, the authentication management resource 340 verifies (authenticates) the received credentials in communication 8410. For example, the authentication management resource 340 knows from previous communications that the user equipment UE2 requested service SVC #4 based on received outer identity information (communications 8310). Based on comparing the received credentials in communication 8410 to the required the password and username stored in repository 181 for service SVC #4, the authentication management resource 340 determines that the user equipment UE2 is authorized to use requested service SVC #4 (such as wireless access to the network 190 through a wireless base station).

In response to the authentication of the user equipment UE2 in processing operation #3, and receiving proper credentials in communication 8410, the authentication management resource 340 transmits communication 8420 (such as Radius Access-Accept message or other suitable message) to the user equipment UE2 in processing operation #4. The communication 8420 indicates that the request for wireless network service SVC #4 is granted by the authentication management resource 340.

As further shown, in processing operation #5, via communications 8510, the user equipment UE2 transmits communication 8510 over the wireless communication link 128 to the wireless base station. The wireless base station 123 forwards the communications 8510 to the gateway 345. In one embodiment, the communications 8510 include a request for retrieval of content from one or more server resources 196 in the wireless network environment 100.

In response to receiving the communication 8510 such as a request for content, in processing operation #6, the gateway 345 transmits communications 8520 to the authentication manager resource 340. In one embodiment, the gateway

345 populates the data field 8520-1 of communications 8520 to include the unique identifier value XXX2 assigned to the user equipment UE2. This notifies the authentication manager resource 340 of the communication device requesting access to the network 190. The gateway 345 further populates the communications 8520 to include value PWD=GWPD235. In one embodiment, the value GWPWD235 represents a password notifying the authentication management resource 340 that the gateway 345 is part of the service provider's network.

As further shown, in processing operation #7, in response to receiving the communications 8520 and permission to provide the user equipment UE2 assigned the unique identifier value XXX2 access to the network 190, the authentication management resource 340 maps the requested service SVC #4 to an appropriate access policy (POLICY-SVC #4) stored in the repository 182 or other suitable entity. In one embodiment, the POLICY-SVC #4 indicates one or more parameters (such as specific web sites that can be accessed, retrieval data bit rates, filters, allowed times, etc.) associated with providing the user equipment UE2 access to the network 190.

In processing operation #8, the authentication manager resource 340 communicates the selected policy or notification of the selected policy in communication 8610 to the gateway 345. In such an instance, the gateway 345 has knowledge of the specific policy (i.e., POLICY-SVC #4) in which to provide the user equipment UE2 access to the network 190 via communications over the wireless communication link 127 and through the gateway 345.

In processing operation #9, in accordance with the applied policy (i.e., POLICY-SVC #4), the gateway 345 forwards received communications 8620 over network 190 to the appropriate target server resource. The target server resource transmits communications 8630 in reverse direction through network 190, gateway 345, and wireless base station 123 to the user equipment UE2 over the wireless communication link 127.

Figure 9:
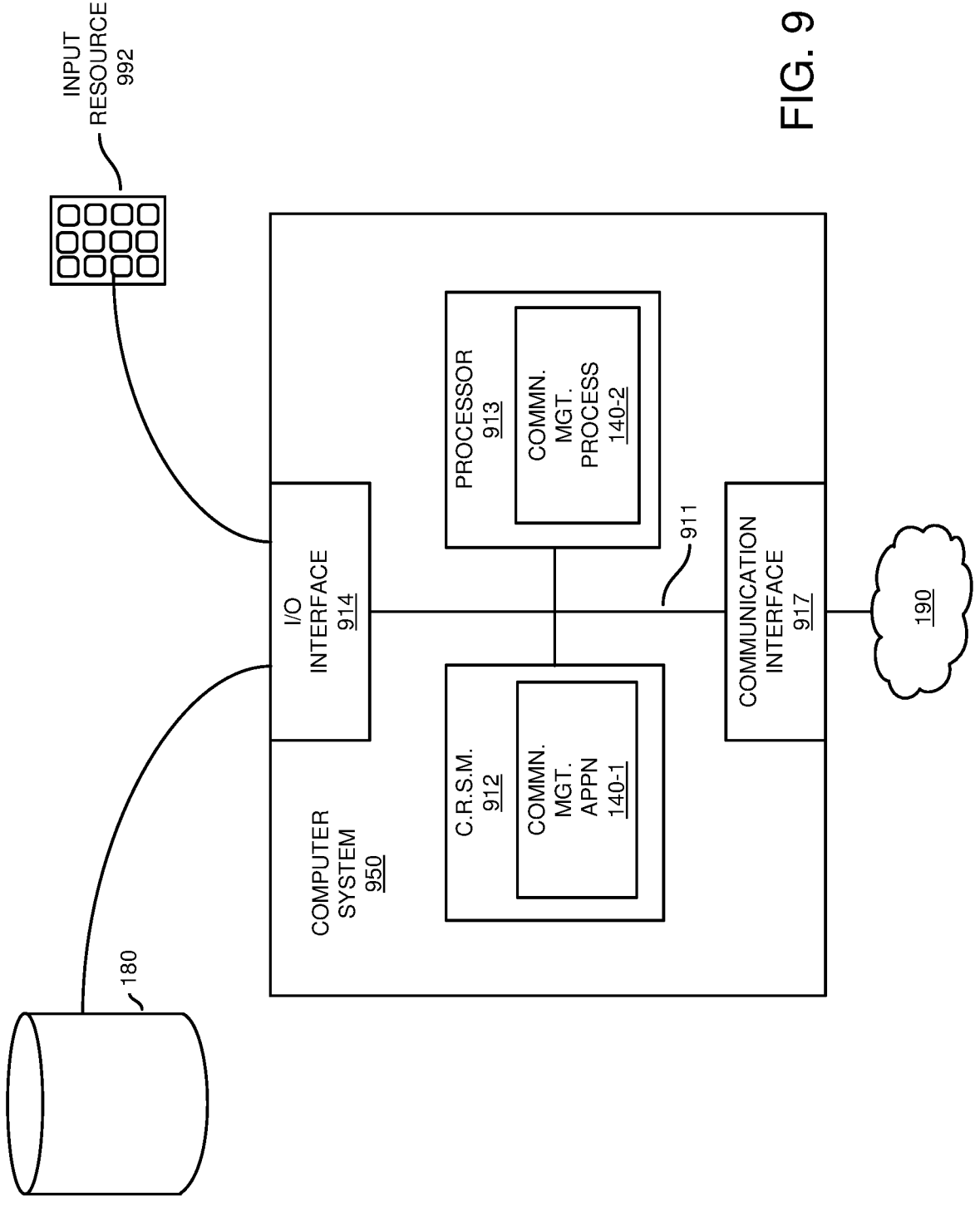
FIG. 9 is an example diagram illustrating example computer architecture operable to execute one or more operations according to embodiments herein.

FIG. 9 is an example block diagram of a computer system for implementing any of the operations as previously discussed according to embodiments herein.

Any of the resources (such as mobile communication devices, wireless access points, wireless stations, wireless base stations, communication management resource, bandwidth management resource, etc.) as discussed herein can be configured to include computer processor hardware and/or corresponding executable instructions to carry out the different operations as discussed herein.

As shown, computer system 1250 of the present example includes an interconnect 1211 that coupling computer readable storage media 1212 such as a non-transitory type of media (which can be any suitable type of hardware storage medium in which digital information can be stored and retrieved), a processor 1213 (computer processor hardware), I/O interface 1214, and a communications interface 1217.

I/O interface(s) 1214 supports connectivity to repository 1280 and input resource 1292.

Computer readable storage medium 1212 can be any hardware storage device such as memory, optical storage, hard drive, floppy disk, etc. In one embodiment, the computer readable storage medium 1212 stores instructions and/or data.

As shown, computer readable storage media 1212 can be encoded with management application 140-1 (e.g., including instructions) to carry out any of the operations as discussed herein.

During operation of one embodiment, processor 1213 accesses computer readable storage media 1212 via the use of interconnect 1211 in order to launch, run, execute, interpret or otherwise perform the instructions in management application 140-1 stored on computer readable storage medium 1212. Execution of the management application 140-1 produces management process 140-2 to carry out any of the operations and/or processes as discussed herein.

Those skilled in the art will understand that the computer system 1250 can include other processes and/or software and hardware components, such as an operating system that controls allocation and use of hardware resources to execute management application 140-1.

In accordance with different embodiments, note that computer system may reside in any of various types of devices, including, but not limited to, a mobile computer, a personal computer system, wireless station, connection management resource, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowcharts in FIGS. 10 and 11. Note that the steps in the flowcharts below can be executed in any suitable order.

FIG. 10 is a flowchart 1000 illustrating an example method according to embodiments. Note that there will be some overlap with respect to concepts as discussed above.

In processing operation 1010, the authentication management resource 340 (i.e., a communication management resource) receives a network access request from first user equipment UE1 in a network environment 100.

In processing operation 1020, the authentication management resource 340 establishes a communication link 405 with the first user equipment UE1 in response to receiving the network access request 310.

In processing operation 1030, the authentication management resource receives a notification 410 from the first user equipment UE1 over the communication link 405; the notification 405 includes access credentials assigned to a particular service requested by the first user equipment UE1.

FIG. 11 is a flowchart 1100 illustrating an example method according to embodiments. Note that there will be some overlap with respect to concepts as discussed above.

In processing operation 1110, a communication management resource 140 produces an access profile AP1. The access profile AP1 specifies one or more services (such as service SVC #1, SVC #2, SVC #4, . . . ) available to multiple instances of user equipment (e.g., mobile communication devices).

In processing operation 1120, the communication management resource 140 distributes the access profile AP1 to each of the multiple communication devices such as user equipment UE1, user equipment UE2, user equipment UE5, and so on. The access profile AP1 includes common credentials used by each of the multiple communication devices to use each of the services.

In processing operation 1130, the communication management resource 140 provides the multiple mobile communication devices UE1, UE2, UE5, etc., access to a remote network 190 based on the common credentials in the access profile AP1.

Note again that techniques herein are well suited to facilitate anonymous access to a respective network. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:

producing a first access profile, the first access profile specifying a first service available to a first set of mobile communication devices;

distributing the first access profile to each of the mobile communication devices in the first set, the first access profile including first common credentials assigned for use by each of the mobile communication devices in the first set to use the first service; and wherein the first common credentials are operative to provide each of the mobile communication devices in the first set access to a remote network.

2. The method as in claim 1, wherein the first common credentials include a first user-name and a first password for repeated use by each of the mobile communication devices in the first set to access the remote network through a set of wireless access points via the first service.

3. The method as in claim 1, wherein the first access profile specifies multiple services available to each of the mobile communication devices in the first set, the first service being one of the multiple services.

4. The method as in claim 1, wherein the first common credentials include an anonymous username credential assigned to the first service.

5. The method as in claim 4, wherein the anonymous username credential is operative to provide each of the mobile communication devices in the first set access to the remote network through a first set of wireless access points configured to provide the first service.

6. The method as in claim 1, wherein the first common credentials include inner identity information assigned for use by each of multiple users of the mobile communication devices in the first set to use the first service.

7. The method as in claim 1, wherein the first access profile provides a mapping of the first service to a first password assigned to the first service and a first anonymous username assigned to the first service.

8. The method as in claim 1, wherein producing the first access profile includes:

selecting the first service amongst multiple available services, the selected first service being one of the multiple available services; and including the first service in the first access profile.

9. The method as in claim 8, wherein producing the first access profile includes:

selecting a second service amongst the multiple available services; and including the second service in the first access profile.

10. The method as in claim 9, wherein producing the first access profile further includes:

providing a first mapping between the first service and a first password and a first anonymous username, the first password and the first anonymous username assigned for use by each of the mobile communication devices in the first set to use the first service; and providing a second mapping between the second service and a second password and a second anonymous user-name, the second password and the second anonymous username assigned for use by each of the mobile communication devices in the first set to use the second service.

11. The method as in claim 1 further comprising:

producing a second access profile, the second access profile specifying a second service available to a second set of mobile communication devices;

distributing the second access profile to each of the mobile communication devices in the second set, the second access profile including second common credentials assigned for use by each of the mobile communication devices in the second set to use the second service; and wherein the second common credentials are operative to provide each of the mobile communication devices in the second set access to the remote network.

12. The method as in claim 11, wherein the first common credentials include a first password assigned to the first service and a first anonymous username assigned to the first service;

wherein the first access profile indicates a mapping of an identity of the first service to the first password assigned to the first service and the first anonymous username assigned to the first service;

wherein the second common credentials include a second password assigned to the second service and a second anonymous username assigned to the second service;

wherein the second access profile indicates a mapping of an identity of the second service to the second password assigned to the second service and the second anonymous username assigned to the second service.

13. The method as in claim 12, wherein the identity of the first service is first outer identity information for use by the mobile communication devices in the first set to request use of the first service;

wherein the first common credentials including the first password and the first anonymous username are first inner identity information for use by the mobile communication devices in the first set to perform authentication for use of the first service;

wherein the identity of the second service is second outer identity information for use by the mobile communication devices in the second set to request use of the second service; and wherein the second common credentials including the second password and the second anonymous username are second inner identity information for use by the mobile communication devices in the second set to perform authentication for use of the second service.

14. The method as in claim 11, wherein the first common credentials include first inner identity information assigned for use by each of the mobile communication devices in the first set to perform a respective anonymous request to use the first service; and wherein the second common credentials include second inner identity information assigned for use by each of the mobile communication devices in the second set to perform a corresponding anonymous request to use the second service.

15. The method as in claim 1, wherein the first common credentials in the first access profile include outer identity information and inner identity information to anonymously request use of the first service.

16. The method as in claim 15, wherein the inner identity information includes a first anonymous username and first password for use by each of the mobile communication devices in the first set to use the first service to wirelessly access the remote network.

17. The method as in claim 16, wherein the outer identity information includes an identity of the first service.

18. The method as in claim 17, wherein the outer identity information enables each of the mobile communication devices in the first set to anonymously request use of the first service via inclusion of the identity of the first service in a respective first communication to an authentication resource; and wherein the inner identity information enables each of the mobile communication devices in the first set to supply the first anonymous username and the first password in a respective second communication to the authentication resource to use the first service.

19. The method as in claim 1, wherein the first common credentials in the first access profile include a first anonymous username configured for use by each of the mobile communication devices in the first set to request use the first service; and wherein the mobile communication devices in the first set include a first mobile communication device and a second mobile communication device; and where distributing the first access profile to each of the mobile communication devices in the first set includes: distributing the first common credentials to the first mobile communication device; and distributing the first common credentials to the second mobile communication device.

20. The method as in claim 19 further comprising:

in response to receiving the first anonymous username in inner identity information in a first communication from the first mobile communication device requesting use of the first service, providing the first mobile communication device use of the first service to access the remote network via the first service; and in response to receiving the second anonymous username in inner identity information in a second communication from the second mobile communication device requesting use of the first service, providing the second mobile communication device use of the second service to access the remote network via the first service.

21. An apparatus comprising:

communication management hardware operative to:

produce an access profile, the access profile specifying a particular service;

distribute the access profile to each of multiple communication devices in a first group assigned the access profile, the access profile including common credentials assigned for use by each of the multiple communication devices in the first group to use the particular service; and wherein the common credentials are configured to provide the multiple communication devices in the first group access to a remote network.

22. The apparatus as in claim 21, wherein the common credentials include a first user-name and a first password for repeated use by each of the multiple communication devices in the first group to access the remote network through a set of wireless access points via the particular service.

23. The apparatus as in claim 21, wherein the common credentials include an anonymous username credential assigned to the particular service.

24. The apparatus as in claim 23, wherein the anonymous username credential is operative to provide each of the multiple communication devices in the first group access to the remote network through a first set of wireless access points configured to provide the first service.

25. The apparatus as in claim 21, wherein the common credentials include inner identity information assigned for use by multiple users of the multiple communication devices to request use of the particular service, the inner identity information indicating an anonymous username credential.

26. Computer-readable storage hardware having instructions stored thereon, the instructions, when carried out by computer processor hardware, cause the computer processor hardware to:

produce an access profile, the access profile specifying a particular service available to multiple mobile communication devices;

distribute the access profile to each of the multiple communication devices, the access profile including common credentials assigned for use by each of the multiple communication devices to use the particular service; and the common credentials operative to provide the multiple communication devices access to a remote network.

* * * * *